(No Model.)
F. MANKEY.
PROCESS OF MAKING VENEERS.
No. 351,061.            Patented Oct. 19, 1886.
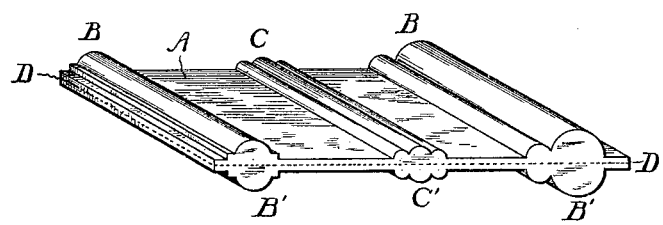
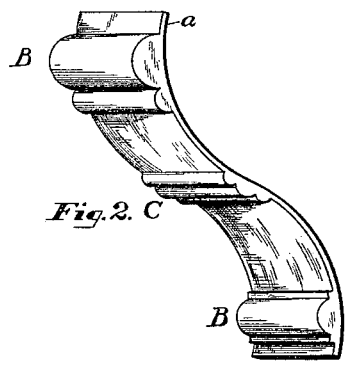
WITNESSES:
Henry N. Paul Jr.
Peter A. Kelly
INVENTOR
F. Mankey
By Hollingsworth & Kelly
Attorneys

UNITED STATES PATENT OFFICE.

FREDERICK MANKEY, OF WILLIAMSPORT, PENNSYLVANIA.

PROCESS OF MAKING VENEERS.

SPECIFICATION forming part of Letters Patent No. 351,061, dated October 19, 1886.

Application filed May 10, 1886. Serial No. 201,660. (No model.)

*To all whom it may concern:*

Be it known that I, FREDERICK MANKEY, of Williamsport, Lycoming county, Pennsylvania, have invented a new and useful Process for Making Veneers, of which the following is a specification.

My invention relates to a method of producing the improved veneer for which on August 25, 1885, I filed an application for Letters Patent. Such veneers are peculiar in that they have upon their surface and integral with their substance raised portions or elevations extending transversely across the grain of the wood.

The present process has for its object the manufacture of such veneers in a rapid and economical manner; and to that end it consists in two steps—first, surface cross-cutting a board, so as to produce raised projections thereon; second, dividing said board lengthwise in a plane parallel to the general direction of the ornamented surface.

In the accompanying drawings, Figure 1 represents a board or plank suitably cut for the production of the veneer, showing said board as it appears after the first stage of the process has been completed; and Fig. 2 represents a veneer cut off from said board and bent for application along the curved surface.

I prefer to take a thin board or plank, A, of suitable width and length for the sheet to be formed, and by the action of rotary cutters to form a series of ridges or projections, B, running crosswise to the general direction of the grain. In order to form two sheets at once, I may cut the opposite surface of the board in the same manner, so as to produce thereon projections B' C'. This done, I divide said board lengthwise, by a saw or any suitable cutting-instrument, on the plane indicated by the dotted lines D, and thus produce simultaneously two sheets of veneers like that indicated by *a* in Fig. 2, each having the solid raised portions or projections running transversely to its grain.

I do not limit myself to this mode of treatment, whereby two veneers are produced simultaneously, since I can obviously make a veneer by surface cross-cutting the board on one side only and then cutting off the sheet. Nor do I limit myself to raised projections which are continuous across the sheet, and of course such projections may be at some other angle to the grain than the right angle.

The method above described is adapted to produce in a highly expeditious and economical manner the veneer referred to, and that which I claim as new is—

The hereinbefore-described process of making veneers with solid projections running transversely to the grain, which consists in first surface cross-cutting a board with any desired pattern, and subsequently dividing said board lengthwise by cutting it in a plane parallel to the general direction of the ornamented surface, substantially as set forth.

FREDERICK MANKEY.

Witnesses:
F. N. PAGE,
F. WEST PAGE.